Patented Nov. 18, 1947.

2,431,056

UNITED STATES PATENT OFFICE 2,431,056

GAS IMPERVIOUS FABRIC

Oscar W. Loudenslager and Joseph E. Wilson, Akron, Ohio, assignors to Wingfoot Corporation, Akron, Ohio, a corporation of Delaware No Drawing. Application November 15, 1945, Serial No. 628,970

17 Claims. (Cl. 154—138)

This invention relates to a new gas impervious composition and to a method for the preparation thereof. The invention particularly relates to a laminated fabric resistant to the transmission of hydrogen and helium, which is especially useful as gas-retaining fabric for balloons, and other lighter-than-air craft, containing these gases.

A fabric suitable for this purpose must be, at once, strong enough to resist the stresses to which it is subjected, relatively impervious to the escape of the gases contained by it and as light in weight as possible to provide maximum useful lift. Many available materials of construction are capable of retaining hydrogen and helium, but most of these are too heavy for lighter-than-air craft construction. Thus, rubber and synthetic latices have been widely used as impregnants for woven textiles in order to achieve the necessary strength and impermeability without excessive weight. However, these and other compositions described in the prior art, while they have the necessary strength, have not proved satisfactory in the construction of lighter-than-air craft with respect to reduction of weight without sacrifice of gas-impermeability. Accordingly, the purpose of this invention is to provide a new gas-impervious fabric which is stronger and lighter in weight than the fabrics heretofore used and yet has a very much lower rate of hydrogen transmission.

In U. S. Patent 2,126,818 to Sager and Houston, is described a balloon cloth impregnated with ethylene polysulfide resins which is said to have a weight of from 5.6 to 5.8 ounces per square yard and a hydrogen diffusion rate of 0.4 to 1.7 liters per square meter per 24 hours. The new material prepared in accordance with this invention is much lighter in weight, for example, 3.5 ounces per square yard, and in many instances is more than ten times as impermeable. The new fabric is also superior in tensile strength to the other known gas-retaining fabrics and has remarkable wear-resisting properties.

The new gas-impervious fabrics are made by cementing together a woven synthetic resin fabric in which the fibers are prepared from linear polyamide resins, and a sheet of solid copolymer of 40 to 80 percent of vinylidene chloride and 20 to 60 percent of a vinyl ester, including vinyl chloride, and other vinyl halides, vinyl acetate and other vinyl esters of a saturated monocarboxylic acid. The fabric and said sheet are cemented together by means of an adhesive comprised of a solution of polyvinyl chloride or of a copolymer of more than 70 percent of vinyl chloride in a suitable solvent.

The linear polyamides useful in the preparation of the fabrics used in the practice of this invention are of two general types: (1) the condensation product of dicarboxylic acids and diamines and (2) resins formed by the concentration of amino acids or the corresponding lactams. The compounds of type (1) may be represented by the structural formula:

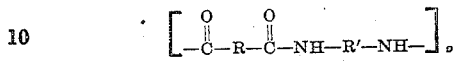

wherein R and R' are hydrocarbon or oxa- or thioxa-hydrocarbon radicals and $x$ is an integer depending upon the extent of polymerization. In the preparation of polyamides of this type, the diamines may be condensed with the esters, amides, acid chlorides and acid anhydrides of the dicarboxylic acids as well as the acids themselves. The compounds of type (2) may be represented by the structural formula:

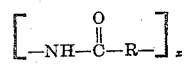

wherein R is a hydrocarbon or oxa- or thioxa-hydrocarbon radical and $x$ is an integer depending upon the extent of polymerization.

In the preparation of polyamide resins of type (1) the dicarboxylic acids may be the simple aliphatic dicarboxylic acids, such as succinic, glutaric, adipic, pimelic, suberic, azelaic, sebacic and brassylic acids, as well as higher homologues and those having aliphatic side chains, the ether acids, such as diglycollic acid, dilactic acid and homologues thereof, the homocyclic dicarboxylic acids, such as paraphenylene-diacetic acid, cyclopentamethylene-dicarboxylic and hexahydro-terephthalic acids, and other dicarboxylic acids. The dicarboxylic acids are condensed with aliphatic, aromatic or araliphatic amines having two primary amino groups, including the aliphatic diamines such as ethylene diamine, trimethylene diamine, tetramethylene diamine, pentamethylene diamine, hexamethylene diamine, octamethylene diamine, and other alkylene diamines, the cyclic amines, such as phenylene diamine, benzidine, cyclohexylene diamine, and para-xylylene diamine, the aliphatic ether diamines, such as triglycol diamine and other polyglycol diamines containing two primary amino radicals.

The polyamides of type (2) may be prepared by the condensation of amino acids containing a single carboxylic acid radical and a single primary amino group, including the aliphatic amino acids, such as 5-amino-caproic acid, 10-amino-undecylic acid, 11-amino-stearic acids, 9-aminopalmitic acid, 13-amino-behenic acid, 9-aminomargaric acid, the same acids having other amino substituents, and other monocarboxylic acid having amino substituents. Preferably acids having carbon chains of five or more carbon atoms are used. The polyamides of type (2) may also be prepared by condensing the esters, amides, lactams, acid chlorides and acid anhydrides of the above-described and other aminoacids.

In the above polyamides it will be noticed that the preferred diamines, dicarboxylic acids and monoamino monocarboxylic acids, preferably have from 4 to 10 carbon atoms separating the various amide linkages. Polyamides so characterized have superior chemical and physical properties to those which have fewer carbon atoms or more carbon atoms in the chain between amide linkages. The expression "amide linkages" is used herein to define a radical consisting of a carbonyl group adjacent to a secondary amino group (—NH—).

The polyamide resins are prepared by heating the amino acid or the derivative of amino-acid or the mixture of dicarboxylic acid and diamine, to a temperature between 100° C. and 300° C., and preferably between 150° C. and 280° C. until a substantial increase in viscosity is noted. The viscosity of the resin mixture is a measure of the extent of condensation and therefore of the molecular weight of the polyamide. Generally, it is desirable to continue the reaction until the molecular weight is in excess of 10,000. The heating is preferably conducted in a closed retort which may be subjected to pressure if desired. The temperature of reaction should be sufficient to melt the reagents in order to induce a practicable rate of reaction. If the reagents have melting points in excess of the desired operating temperature, it may be desirable to introduce into the retort a sufficient amount of a suitable solvent, e. g. benzene or dioxane for the purpose of dissolving the reagents, thereby producing a homogeneous liquid phase in the reactor. After the condensation reaction has proceeded to the desired extent, the resulting resins are drawn into filaments, fabricated into yarn by the combination of a plurality of filaments, and woven into fabrics by methods well known to the art. Fabrics of this type are commercially available.

The sheet of copolymer of 40 to 80 percent of vinylidene chloride and 20 to 60 percent of a vinyl ester which is cemented to the polyamide resin fabric is prepared by the conjoint polymerization of vinylidene chloride and the vinyl ester in suitable proportion to yield the composition desired. The polymerization may be conducted by heating the comonomers in the presence of suitable catalysts, such as the peroxides, e. g., benzoyl peroxide, hydrogen peroxide and salts of persulfuric acid. Suitable agents for stabilizing emulsions may also be present such as the salts of high molecular weight organic acids, which salts have both hydrophilic and hydrophobic radicals, i. e., sodium lauryl sulfate, the sodium salts of naphthalene sulfonic acid, and the salts of various sulphonated hydrocarbons. The mixture of monomers, water, catalyst and emulsion stabilizer is heated to the temperature required to induce polymerization, preferably between 30° C. and 80° C., while stirring, rocking or otherwise agitating the mixture in a closed reaction vessel. Upon the completion of the polymerization the emulsion is coagulated by adding alcohol, salt or other electrolyte. The coagulated copolymer is then milled, or otherwise mixed to destroy the granular or pulverulent structure and render the composition homogeneous. Frequently plasticizers, such as dibutyl phthalate and tri-cresyl phosphate are useful in facilitating the milling operation. The sheet of copolymer can be prepared by calendering or by blowing a soft mass of plastic composition to a thin walled inflated shape and subsequently cutting the shape and unfolding the plastic sheet. Sheets of suitable copolymers of this type are available commercially.

The sheet of copolymer and the polyamide fabric are cemented together using an adhesive comprised of polyvinyl chloride or a copolymer of over 70 percent of vinyl chloride dissolved in any suitable solvent. The adhesive may be a solution of a copolymer of vinyl chloride and up to 30 percent of another polymerizable substance, such as vinyl acetate, or other vinyl ester of a monocarboxylic acid, methyl acrylate, ethyl acrylate or other alkyl acrylate or an alkyl alpha-alkyl-acrylate, such as ethyl methacrylate, or an alkyl alpha-haloacrylate, such as methyl chloroacrylate, allyl acetate, methallyl acetate or the corresponding esters of other monocarboxylic acids, vinylidene chloride or the corresponding derivatives of other halogens, ethyl maleate, ethyl fumerate, the ethyl halo-fumarates or other alkyl derivatives of unsaturated dicarboxylic acids.

The solvent in which the vinyl chloride or vinyl chloride copolymer is dissolved is not critical since it does not become a part of the laminated composition, being evaporated prior to the use of the fabric. Although any solvent may be used, those of greatest utility have been found to be aromatic hydrocarbons, such as benzene and toluene, esters, such as ethyl acetate and butyl acetate, and especially the ketones, such as acetone and methyl ethyl ketone. The adhesives are prepared by dissolving the polyvinyl chloride or the vinyl chloride copolymer in the solvent to the extent of 10 to 40 percent, the higher concentrations being preferred.

The laminated compositions are prepared by coating the polyamide fabric with the adhesive solution by spraying, brushing, or other equivalent technique and thereafter superposing the sheet of vinylidene chloride copolymer. Generally, it is desirable to press the laminated composition in order to insure a uniform and continuous contact between all parts of the laminated layers and to force out of the interstices any excess adhesive. This pressing operation is most conveniently performed in a continuous operation by passing the laminated composition between a pair of rotating cylinders, but other methods of applying pressure may also be employed. After firmly bonding the polyamide fabric and the vinylidene chloride copolymer sheet the adhesive is dried in air at room temperature or by passing the laminated composition through a moderately heated oven until the solvent in the adhesive is evaporated.

Further details of the invention are set forth with respect to specific examples as follows:

*Example 1*

A light weight fabric (1.7 ounce per square yard) woven of drawn filaments of a linear polyamide made by condensing hexamethylene tetramine with adipic acid was coated with a 27 percent solution of polyvinyl chloride in methyl ethyl ketone, and containing approximately 1 percent of carbon black. A sheet of a copolymer of 65 percent vinylidene chloride and 35 percent vinyl chloride, 0.001 inch in thickness was superposed on the coated fabric. The superposed layers were firmly pressed together by means of a hand roller. The laminated fabric so prepared dried within a few minutes in air at room temperature.

The hydrogen permeability was measured and all measurements were found to be between 0.1 and 0.2 liters/square meter/24 hours. This exceptionally impervious fabric had a weight of only 3.5 ounces per square yard and was found to be lighter in weight and much stronger than any other comparably effective balloon fabric previously known to the art.

Example 2

The balloon fabric made in accordance with this invention was tested to determine the water absorptions both on immersion and on exposure to an atmosphere of 94 percent relative humidity. As a control a comparable balloon fabric made of cotton cloth with alternate layers of gelatine and rubber latex superposed thereon in accordance with the invention of William C. Calvert (U. S. 1,846,309). The gelatin latex fabric used as a control was one identified as Q39A2 weighing 5.5 to 6.0 ounces per square yard and having a hydrogen diffusion rate of 0.6 liters/m²/da. The gelatin latex fabric was identical to that used in the construction of the Zeppelin type air craft by the Goodyear Zeppelin Company known as the "Akron" and the "Macon." The water absorption values are important because they represent a loss of lifting power encountered if the air craft is used in an atmosphere of high relative humidity or if the air craft becomes wet with rain or atmospheric condensate.

The immersion tests were made by covering the samples with water for five days and measuring the increase in weight. It was found that the gelatin latex fabric absorbed over 93 percent of its weight in water. The fabric made in accordance with the invention absorbed only 12.3 percent of its weight.

The two fabrics were also tested by contacting them with an atmosphere of 94 percent relative humidity until the saturation point was reached. It was found that the gelatin latex fabric had increased in weight 39 percent while the fabric made in accordance with this invention had increased only 35 percent.

Although this invention has been described with respect to specific examples it is not intended that the details thereof shall be construed as limitations upon the scope of the invention except to the extent incorporated in the following claims.

We claim:

1. A light weight gas-impervious laminated composition which comprises a continuous sheet of a copolymer of 40 to 80 percent of vinylidene chloride and 20 to 60 percent of a vinyl ester cemented to a woven fabric of linear polyamide resin fibers by means of an adhesive comprising a polymer of 70 to 100 percent of vinyl chloride.

2. A light weight gas-impervious laminated composition which comprises a sheet of a copolymer of 40 to 80 percent of a vinylidene chloride and 20 to 60 percent of a vinyl ester; a fabric woven from yarns comprised of fibers of linear polyamides of the group consisting of (A) condensation products of dicarboxylic acids and diamines and (B) condensation products of amino acids, and an adhesive comprised of a polymer of 70 to 100 percent of vinyl chloride disposed between said sheet and said fabric.

3. A light weight gas-impervious laminated composition which comprises a continuous sheet of a copolymer of 50 to 70 percent of vinylidene chloride and 30 to 50 percent of a vinyl halide cemented to a woven fabric of linear polyamide resin fibers by means of an adhesive comprised of a polymer of 70 to 100 percent of vinyl chloride.

4. A light weight gas-impervious laminated composition which comprises a sheet of a copolymer of 50 to 70 percent of vinylidene chloride and 30 to 50 percent of a vinyl halide, a fabric woven from yarns comprised of fibers of linear polyamides of the group consisting of (A) condensation products of dicarboxylic acids and diamines and (B) condensation products of amino acids, and an adhesive comprised of a polymer of 70 to 100 percent of vinyl chloride disposed between said sheet and said fabric.

5. A light weight gas-impervious laminated composition which comprises a continuous sheet of a copolymer of 40 to 80 percent of vinylidene chloride and 20 to 60 percent of vinyl chloride cemented to a woven fabric of linear polyamide resin fibers by means of an adhesive comprised of polyvinyl chloride.

6. A light weight gas-impervious laminated composition which comprises a sheet of a copolymer of 40 to 80 percent of vinylidene chloride and 20 to 60 percent of vinyl chloride; a fabric woven from yarns comprised of fibers of linear polyamides of the group consisting of (A) condensation products of dicarboxylic acids and diamines and (B) condensation products of amino acids, and an adhesive comprised of polyvinyl chloride disposed between said sheet and said fabric.

7. A light weight gas-impervious laminated composition which comprises a continuous sheet of a copolymer of 40 to 80 percent of vinylidene chloride and 20 to 60 percent of vinyl chloride cemented to a woven fabric of linear polyamide resin fibers by means of an adhesive comprised of a copolymer of more than 70 percent of vinyl chloride and up to 30 percent of a copolymer of the group consisting of the vinyl esters of monocarboxylic acids, the esters of acrylic acid and the alpha alkyl and alpha halo-acrylic acids, the allyl esters of monocarboxylic acids, the vinylidene halides, and the esters of unsaturated dicarboxylic acids.

8. A light weight gas-impervious laminated composition which comprises a sheet of a copolymer of 40 to 80 per cent of vinylidene chloride and 20 to 60 percent of vinyl chloride, a fabric woven from yarns comprised of fibers of linear polyamides of the group consisting of (A) condensation products of dicarboxylic acids and diamines and (B) condensation products of amino acids, and an adhesive comprised of a copolymer of more than 70 percent of vinyl chloride and up to 30 percent of a copolymer of the group consisting of the vinyl esters of monocarboxylic acids, the esters of acrylic acid and the alpha alkyl and alpha halo-acrylic acids, the allyl esters of monocarboxylic acids, the vinylidene halides, and the esters of unsaturated dicarboxylic acids.

9. A light weight gas-impervious laminated composition which comprises a continuous sheet of a copolymer of 50 to 70 percent of vinylidene chloride and 30 to 50 percent of vinyl chloride cemented to a woven fabric of linear polyamide resin fibers by means of an adhesive comprised of a copolymer of more than 70 percent vinyl chloride and up to 30 percent of ethyl fumarate.

10. A light weight gas-impervious laminated composition which comprises a sheet of a copolymer of 50 to 70 percent of vinylidene chloride and 30 to 50 percent of vinyl chloride, a fabric woven from yarns comprised of fibers of linear polyamides of the group consisting of (A) condensation products of dicarboxylic acids and diamines and (B) condensation proucts of amino acids, and an adhesive comprised of a copolymer of more than 70 percent vinyl chloride and up to 30 percent of ethyl fumarate.

11. A light weight gas-impervious laminated composition which comprises a continuous sheet of a copolymer of 50 to 70 percent of vinylidene chloride and 30 to 50 percent of vinyl chloride cemented to a woven fabric of linear polyamide resin fibers by means of an adhesive comprised of a copolymer of more than 70 percent of vinyl chloride and up to 30 percent of vinyl acetate.

12. A light weight gas-impervious laminated composition which comprises a sheet of a copolymer of 50 to 70 percent of vinylidene chloride and 30 to 50 percent of vinyl chloride, a fabric woven from yarns comprised of fibers of linear polyamides of the group consisting of (A) condensation products of dicarboxylic acids and diamines and (B) condensation products of amino acids, and an adhesive comprised of a copolymer of more than 70 percent of vinyl chloride and up to 30 percent of vinyl acetate.

13. A method of preparing a light weight gas-impervious laminated composition which comprises coating a woven fabric of linear polyamide resin fibers with a solution of a polymer of 70 to 100 percent of vinyl chloride, superposing on the coated fabric a sheet of a copolymer of 40 to 80 percent of vinylidene chloride and 20 to 60 percent of vinyl chloride, pressing the superposed layers to effect a uniform bond, and drying the composition until the solvent is evaporated.

14. The method of preparing a light weight gas-impervious laminated composition which comprises coating a woven fabric of linear polyamide resin fibers with a ketone solution of polyvinyl chloride, superposing on the coated fiber a sheet of a copolymer of 40 to 80 percent of vinylidene chloride and 20 to 60 percent of vinyl chloride, pressing the superposed sheets to effect a uniform bond, and drying the laminated composition until the solvent is evaporated.

15. A method of preparing light weight gas-impervious laminated compositions which comprises coating a woven fabric of linear polyamide resin fibers with a ketone solution of a copolymer of more than 70 percent vinyl chloride and up to 30 percent of another comonomer of the group consisting of vinyl esters of mono carboxylic acids, esters of acrylic and alpha alkyl and alpha haloacrylic acids, allyl esters of monocarboxylic acids, vinylidene halides, and esters of unsaturated dicarboxylic acids, superposing on the coated fabric a sheet of a copolymer of 40 to 80 percent of vinylidene chloride and 20 to 60 percent of vinyl chloride, pressing the superposed sheets to effect a uniform bond, and drying the laminated composition until the ketone solvent is evaporated.

16. A method of preparing light weight gas impervious laminated compositions which comprises coating a woven fabric of linear polyamide resin fibers with a methyl ethyl ketone solution of a copolymer of more than 70 percent of vinyl chloride and up to 30 percent ethyl fumarate, superposing on said coated fabric a sheet of a copolymer of 40 to 80 percent of vinylidene chloride and 20 to 60 percent of vinyl chloride, pressing the superposed sheets to effect a uniform bond and drying the laminated sheet until the methyl ethyl ketone is evaporated.

17. The method of preparing a light weight gas-impervious laminated composition which comprises coating a woven fabric of linear polyamide resin fibers with a methyl ethyl ketone solution of a copolymer of more than 70 percent of vinyl chloride and up to 30 percent of vinyl acetate, superposing on the coated fabric a sheet of a copolymer of 40 to 80 percent of vinylidene chloride and 20 to 60 percent of vinyl chloride, pressing the superposed sheets to effect a uniform bond and drying to evaporate the methyl ethyl ketone.

OSCAR W. LOUDENSLAGER.
JOSEPH E. WILSON.

Certificate of Correction

Patent No. 2,431,056. November 18, 1947.

OSCAR W. LOUDENSLAGER ET AL.

It is hereby certified that error appears in the printed specification of the above numbered patent requiring correction as follows: Column 5, line 52, for "35 per cent" read *3.5 percent*; and that said Letters Patent should be read with this correction therein that the same may conform to the record of the case in the Patent Office.

Signed and sealed this 20th day of April, A. D. 1948.

[SEAL]

THOMAS F. MURPHY,
*Assistant Commissioner of Patents.*